Jan. 22, 1946.  E. A. BERGER  2,393,280
FLUID PRESSURE REDUCER
Filed March 24, 1944
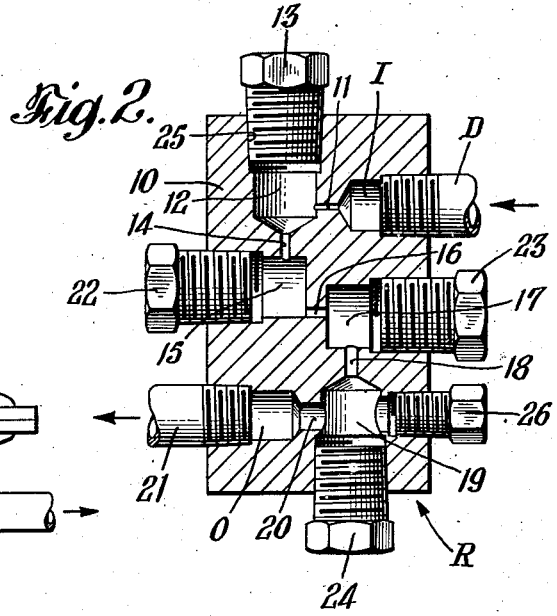
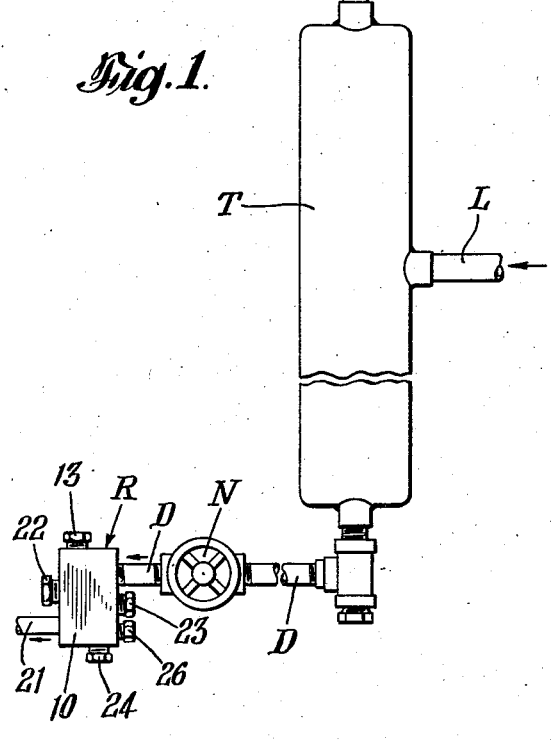
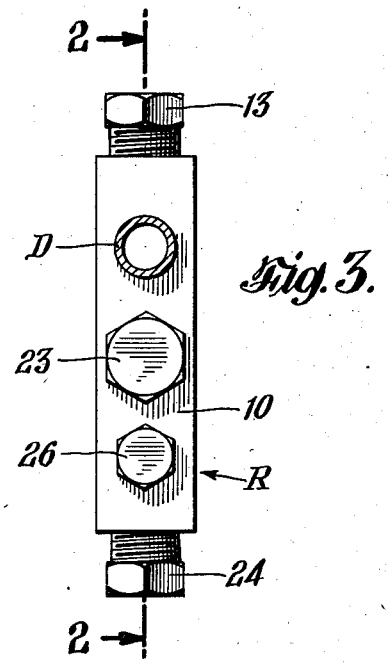
INVENTOR
ELWOOD A. BERGER
BY
ATTORNEY Patented Jan. 22, 1946

2,393,280

UNITED STATES PATENT OFFICE 2,393,280

FLUID PRESSURE REDUCER

Elwood A. Berger, Indianapolis, Ind., assignor to The Prest-O-Lite Company, Inc., a corporation of New York Application March 24, 1944, Serial No. 527,991

3 Claims. (Cl. 138—42)

This invention relates to an improved fluid pressure reducer of the type employing a succession of orifices of progressively increasing size. By a novel arrangement of expansion chambers and interconnecting orifices, the device has many advantages.

Objects of the invention are to provide a device which, because of its great strength, is extremely safe, even at high operating pressures; occupies little space; is easily cleaned; and is highly effective in reducing the pressure of a gas flowing therethrough, especially when the compactness of the device is taken into consideration. Another object is to provide an improved device for draining high pressure acetylene traps.

The manner in which these and other objects are attained by the invention will be apparent from the following description having reference to the accompanying drawing in which:

Fig. 1 is an elevational view of an acetylene supply system containing a device exemplifying the invention;

Fig. 2 is a sectional view of such device taken on line 2—2 of Fig. 3; and

Fig. 3 is an elevational view of the device.

Although the device has other uses, the following description describes its use in draining an oil and water trap in a high pressure acetylene supply system. Use of the device for such purpose is especially advantageous because the trap may be drained without interrupting the flow of acetylene through the system in which the trap is installed. It is usual practice to reduce the pressure of compressed acetylene being discharged into the atmosphere such that the gauge pressure of the acetylene discharged does not exceed fifteen pounds per square inch. When liquid is discharged from an oil and water trap installed in a high pressure acetylene line, the liquid contents of the trap are first discharged and are then followed by a momentary flow of acetylene after the liquid has been drained from the trap but before a valve controlling the draining operation can be closed. The device reduces the pressure of such momentary outflow of acetylene to fifteen pounds per square inch or less.

Fig. 1 shows an oil and moisture trap T in a high pressure acetylene supply line L. Arrows indicate the direction of flow of the acetylene through the line. Because the discharge pressure of a pressure reducer R varies with changes in the line pressure, a back-pressure valve B is, among other reasons, employed to hold the pressure upstream with respect to the pressure reducer R at a constant value. A drain line D runs from the bottom of the trap to the pressure reducer R and includes a valve N for controlling the flow of accumulated liquid and acetylene from the trap T during the draining period.

Figs. 2 and 3 illustrate an embodiment of the invention wherein the pressure reducer R comprises a one-piece metal block 10 having therein a novel series of chambers and a series of constantly unrestricted orifices severally opening into and directly connecting successive chambers. The chambers shown are cylindrical, with the longitudinal axes of the chambers lying in the same plane. The end chambers of the series constitute the inlet I and the outlet O, respectively, of the device. The orifices severally directly connecting the chambers to one another have their axes disposed in the same plane as the axes of the chambers but are angularly disposed relatively to one another to provide a zigzag or tortuous path through the device. Such arrangement of orifices with respect to chambers causes the jet of fluid discharged from each orifice except the last to impinge against a wall of the chamber and thereby reduce the force of the jet. The diameters of the orifices progressively increase as the fluid being discharged flows through successive orifices. The cross-sectional areas of the orifices are such that the orifice farthest upstream controls the mass rate of flow through the device R and each succeeding orifice permits a mass rate of flow at least equal to that of the orifice immediately upstream therefrom.

When the valve N is opened, the contents of the trap T flow through the drain line D and discharge into the inlet chamber I, through the smallest orifice 11, and into a chamber 12 which is sealed from the atmosphere by plug 13. The fluid then passes from chamber 12 through an orifice 14 of greater diameter than orifice 11, into chamber 15, and so on in succession through the orifice 16, chamber 17, orifice 18, chamber 19 and orifice 20, into the outlet chamber O and the discharge line 21 which is open to the atmosphere, thereby reducing in steps the pressure of any gas flowing through the device. The threaded chamber plugs 13, 22, 23, and 24 are removably secured in passages to the chambers intermediate the end chambers. For example, plug 13 is threaded into passage 25 extending from chamber 12 to the exterior of the block. Thus, ready access to the intermediate chambers and the orifices opening into them is provided. Each passage is so constructed and arranged that the projection of the cross-sectional configuration of the corresponding orifice along the longitudinal axis thereof lies within the passage so that the orifice is easily accessible from the exterior of the block. At the chamber 19 next preceding the outlet chamber 0 an additional plug 26 may be provided to seal a passage having a threaded surface intended for connection to a pressure gauge (not shown) to be used in checking the operation of the device.

While a specific embodiment of the invention has been described for the purpose of illustrating the principles thereof, it should be understood that the invention may be otherwise embodied and the dimensions and the interrelation of parts changed without departing from the principles of the invention.

What is claimed is:

1. A fluid pressure reducer having a high pressure fluid inlet; a low pressure fluid outlet; a series of chambers between said inlet and said outlet, one end chamber of said series communicating with said inlet and the other end chamber of said series communicating with said outlet; and orifices severally opening into and directly connecting said chambers to one another, said chambers and the axes of successive orifices being arranged relatively to one another to provide a zigzag fluid path through said pressure reducer, and the diameters of the successive orifices progressively increasing toward said outlet to reduce the fluid pressure in steps from a high pressure to a low pressure.

2. A device for draining liquid from a high pressure acetylene oil and water trap, said device comprising a one-piece metal block having a series of chambers formed therein, the axes of said chambers being in the same plane and the end chambers of such series constituting the inlet and the outlet, respectively, of said device; orifices severally opening into and directly connecting said chambers to one another, the axes of said orifices being disposed in said plane and the axes of successive orifices being angularly disposed relatively to one another to provide a zigzag path through said device, and the diameters of the successive orifices progressively increasing from the inlet chamber to the outlet chamber, to reduce the fluid pressure in steps from a high pressure to a low pressure; and a plug constituting a closure for and removably secured in each chamber intermediate said end chambers, to permit access to each intermediate chamber and the orifices opening into the same.

3. A gas pressure reducer comprising a block having a plurality of chambers including an inlet chamber and an outlet chamber, orifices serially interconnecting said chambers, a passage extending from each chamber to the exterior of said block, said passage being so constructed and arranged that the projection of the cross-sectional configuration of the corresponding orifice along the longitudinal axis thereof lies within said passage, whereby each orifice is accessible from the exterior of said block; and removable means sealing each such passage intermediate said inlet chamber and said outlet chamber.

ELWOOD A. BERGER.